United States Patent [19]
Reed

[11] Patent Number: 4,707,043
[45] Date of Patent: Nov. 17, 1987

[54] ELECTRICAL CONNECTOR

[76] Inventor: Charlie C. Reed, 3206 Elegia Dr., Houston, Tex. 77080

[21] Appl. No.: 925,962

[22] Filed: Nov. 3, 1986

[51] Int. Cl.⁴ .......................................... H01R 13/44
[52] U.S. Cl. .................................... 439/142; 439/135; 439/594; 439/638; 439/892
[58] Field of Search ................... 339/36, 38, 39, 44 R, 339/44 M, 59–63, 76–78, 32, 34, 47 R, 49 R, 154 R, 154 A, 156 R, 156 T, 157 R

[56] References Cited

U.S. PATENT DOCUMENTS

| | | | |
|---|---|---|---|
| 3,201,617 | 8/1965 | Pacoroni et al. | 339/154 R |
| 3,772,633 | 11/1973 | Danesi | 339/154 R |
| 3,876,273 | 4/1975 | Schwartz | 339/44 R |
| 4,408,813 | 10/1983 | Koehler | 339/44 R |
| 4,445,741 | 5/1984 | Annoot | 339/49 R |

OTHER PUBLICATIONS

Model Nos. "KC2L-4, KC2C" Electrical Connectors, manufactured by Houston Geophysical Products, bearing Patent No. 4,445,741.
Model No. "SCDP" Electrical Connector, manufactured by Texas Geophysical Supply under applicant's authority under this patent application.

*Primary Examiner*—Gil Weidenfeld
*Assistant Examiner*—Paula A. Austin
*Attorney, Agent, or Firm*—Al Harrison; Edmund F. Bard

[57] ABSTRACT

Methods and means are provided for detachably interconnecting electrical components in an electrical system located and used in a disadvantageous environment. An improved connector device is provided which is composed of spaced-apart metallic terminals embedded in a substantially rectangular body member and adapted to be electrically joined with leads in a cable or the like. One pin-end portion of each terminal is located in a sidewall recess in the body member, and the other socket-like end portion of the terminal projects into and through a plug-like extension from the body member opposite the sidewall recess containing the pin-like end portion. Two or more such connectors may be stacked together in a fluid-tight manner, by inserting the plug-like projections from the block of one connector into the sidewall recesses in the block portion of another connector, whereby the socket-like ends of the terminals in the first connector receive the pin-like ends of the terminals in the other block member, and also whereby any water or other electrically conductive fluid on the connections will be prevented from creating an electrically conductive path between the terminals therein.

20 Claims, 7 Drawing Figures

ELECTRICAL CONNECTOR

BACKGROUND OF INVENTION

It is well known that any relatively large or extensive electrical system is always particularly susceptible to malfunction because of the occurrence of "shorts" or "opens" within the system, and that these shorts and the like tend to appear most often at points of connection of one component or section of the system to another. It is further well known that this phenomenon is especially likely in any system which must be installed and operated outdoors rather than in a sealed or otherwise protected environment.

This is particularly the case with seismic exploration systems and the like, which include a trunk line or main cable laid on the ground along a surveyed course, and which also includes secondary lines branching off of the trunk line at preselected locations. Such a system may extend as much as a mile or more over the ground, and is therefore installed and connected together in sections before being operated. Furthermore, such a system is ordinarily installed and used only temporarily in any particular location, before it is disassembled and moved to another location of interest.

It will readily be apparent that such a system is particularly susceptible to problems of malfunction, not only because it must be continually connected and disconnected, whenever it is moved from one location to another, but because it must often be installed and used in the most disadvantageous of environments. In particular, it is not uncommon that seismic geophysical surveys are performed in wholly or partially submerged areas such as swamps and the like, where the likelihood that water may invade and short out portions of the circuitry is ever present.

It is, of course, well within the skill and experience of this industry to seal all electrically conductive portions of the circuitry in a seismic system and the like, in a manner to reduce to a minimum the likelihood of such water penetration. It should be noted, however, that such a system would then be a single unit which would be burdensome to transport over a dry cleared terrain, and that it would be almost impossible to properly deploy such a system within a swamp or other such submerged area. Accordingly, it is a recognized necessity that such a system must be sectionalized whereby it can be disconnected into components of manageable size before it is transported and deployed in sections of reasonable size.

It will be apparent, however, that the possibility that water may penetrate and cause a malfunction in the circuitry is always greatest at those points wherein one section of the system is designed to be detachably interconnected with another section of the system. For this reason, it has heretofore been the practice to employ connectors of junction components which can be joined in a manner to substantially minimize if not prevent such water penetration. However, such connectors are relatively difficult to couple together since they utilize screw-type latches to squeeze them into engagement, and to thereby create a barrier against invading water. This, in turn, greatly extends the time required to both assemble and disassemble the system, and it may even require the use of special tools.

It will be apparent that, not only is the task of assembling a geophysical exploration network relatively difficult even when in a relatively dry and cleared area, the difficulties are compounded when the operators of the system are required to work in swamp areas and the like, where footing is always uncertain and precarious at best, and also where they are often required to perform these tasks while sitting in a boat or other unstable structure. Furthermore, if a malfunction occurs notwithstanding, and if the operators must then travel back along the entire network to laboriously uncouple and then reconnect each junction in the network, it will be readily apparent that there has long been a need for a better way of interconnecting electrical components under such conditions.

Accordingly, these limitations and disadvantages of the prior art are overcome with the present invention, and improved electrical connection means and techniques are provided which are especially useful for circuitry which is installed and used in partially or wholly submerged areas and other disadvantageous environments.

SUMMARY OF INVENTION

In a preferred embodiment of the present invention, an improved connector for detachably interconneting a plurality of electrical components to an electrical system located in an adverse environment is provided. More particularly, a said connector is preferably attached to the conductors of an electrical component, and another said connector is preferably attached to the conductors of another electrical component, whereby the said connectors may be quickly abuttedly joined to form an improved junction assembly.

Referring now to the improved connector, it includes a pair of single piece metallic terminals, with a pin-like end and a socket-like end, imbedded in a substantially rectangular molded body member constructed of polyurethane, neoprene and the like. Each of these terminals is interconnected with a lead from an electrical component to be attached to the connector. The two terminals are imbedded within the body member to protect them from invasion by water and other deleterious environmental elements.

In particular, each terminal has its pin-like end axially disposed in a cylindrical recess on a sidewall of the body member, and its socket-like end axially imbedded in a cylindrical projection on the opposite sidewall of the body member. For each such terminal, the diameter of its cylindrical recess is the same as the diameter of its corresponding cylindrical projection. Furthermore, both pin-like ends of the terminals are disposed on one sidewall of the body member, and both socket-like ends of the terminals are disposed on the opposite sidewall of the body member.

To create an absolute seal from the environment, each said sidewall is matched with a corresponding strap-like member that closes off the sidewall. Flexibly attached to the body member, each strap-like member is bent to mesh with its corresponding terminal end. Thus, one strap-like member contains two caps which are designed to match the socket-like ends projecting from one sidewall. Another strap-like member contains two plug-like members which are designed to match the pin-like ends imbedded within the recesses contained on the opposite sidewall.

To interconnect a plurality of electrical components, the plug-like sidewall with an electrical component attached thereto is abuttably inserted into the corresponding socketlike sidewall with another electrical component attached thereto. Another important feature of the connector herein is that the said interconnection of two electrical components may be sensed to be complete in three ways. First, the plug-like sidewall may be observed to be flush with the socket-like sidewall. Second, the plug-like sidewall may be felt to be fully inserted into the corresponding socket-like sidewall by use of one's tactile sense. Third, the plug-like sidewall may be heard to be fully inserted into the said socket-like sidewall because a characteristic audible sound is manifest when the said interconnection is complete.

An additional feature of the preferred embodiment of the present invention is that the diameters of each of the two recesses, and correspondingly, of each of the two projections are unequal. This permits a plurality of connectors to be abuttably joined in only one way. That is, the projection with the larger diameter on one connector must be inserted into the recess with the same larger diameter on the other connector, and correspondingly, the projection with the smaller diameter on the said one connector must be inserted into the recess with the smaller diameter on the said other connector. Contrary joinder of the two connectors is rendered impossible by the differing diameters of the said projection with the said connector. Hence, it is a feature of this improved connector, that electrical connections with reversed polarity are impossible.

Furthermore, when an improved connector within a junction assembly is located on an end of the junction, that is, when a sidewall of a connector is not abutted to another connector, its free terminal end is sealed with the corresponding strap-like member.

The preferred embodiment of the present invention solves the myriad problems confronting electrical connectors applied under adverse conditions. The means provided herein enables a plurality of connectors to be expeditiously interconnected. Specifically, the quick disconnect/connect feature not only makes in situ maintenance possible, but also tends to minimize the labor necessary to service and repair electrical components under adverse conditions. Furthermore, special skills and tools are unnecessary to hook up and unhook electrical connections. Additionally, the said in situ maintenance may be accomplished almost instantaneously, thereby minimizing the time workers are exposed to offensive conditions, not to mention health and safety hazards.

Another important feature of the improved connector is the absolute seal effected by its unique design. Regardless of the number of connectors which are incorporated into a junction assembly, invasion by water and the like is precluded. This feature promotes the existence of reliable electrical connections and tends to minimize maintenance. Additionally, the improved connector precludes the worker from hooking up electrical connections with reversed polarity because incorrect hook-ups cannot physically be made.

Accordingly, it is an object and feature of the present invention to provide an improved electrical connector for use in a disadvantageous environment.

It is also an object of the present invention to provide an improved junction assembly of electrical components and connectors sealed fluid-tightly from invasion by environmental fluids.

It is a further object of the present invention to provide an improved electrical connection device which may be expeditiously coupled and decoupled without the need for special tools or techniques.

It is a specific object of the present invention to provide an improved junction assembly for detachably interconnecting a plurality of electrical components to a seismic exploration network or other electrical system located in a deleterious environment, comprising a first substantially rectangular body member formed of a water-impervious insulating material with a plurality of sidewall recesses, a corresponding plurality of plug-like extensions projecting oppositely of said recesses, a first strap-like portion carrying a corresponding plurality of cap-like projections, and a second strap-like portion carrying a corresponding plurality of plug-like extensions, a first plurality of electrical terminal members fixedly disposed in said first body member for interconnection with one of said components and each with a pin-like end portion projecting into one of said recesses and a socket-like opposite end portion extending into one of said plug-like extensions, a second substantially rectangular body member formed of a water-impervious insulating material with a plurality of sidewall recesses, a corresponding plurality of plug-like extensions projecting oppositely of said recesses, a third strap-like portion carrying a corresponding plurality of cap-like projections, and a fourth strap-like portion carrying a corresponding plurality of plug-like extensions, and a second plurality of electrical terminal members fixedly disposed in said second body member for interconnection with another different one of said components and each with a pin-like end portion projection into one of said recesses and a socket-like opposite end portion extending into one of said plug-like extensions, said second body member being positioned abuttably against said first body member with said plug-like extensions projecting from said second body member inserted into corresponding sidewall recesses in said first body member and with the pin-like end portions of the terminals in the sidewall recesses in said first body member being inserted into the socket-like end portions of the terminals in corresponding ones of said plug-like extensions projecting from said second body member.

It is also a specific object of the present invention to provide, in a junction assembly for interconnecting an electrical component to a seismic exploration network or other electrical system, an improved connector in combination therewith comprising a substantially rectangular body member formed of a water-impervious insulating material and having a plurality of sidewall recesses, a corresponding plurality of open-ended and plug-like projections extending oppositely of said recesses, a first strap-like portion extending flexibly therefrom with a corresponding plurality of cap-like projections at the tip thereof, and a second strap-like portion extending flexibly therefrom with a corresponding plurality of open-ended and plug-like projections at the tip thereof, and a corresponding plurality of metallic terminal members imbedded fixedly in said body member for electrical interconnection with said component and each having a pin-like end portion extending into one of said sidewall recesses and a socket-like opposite end portion extending into and through one of said plug-like projections extending from said body member oppositely of one of said sidewall recesses therein.

These and other objects and features of the present invention will become apparent from the following detailed description, wherein reference is made to the figures in the accompanying drawings.

DETAILED DESCRIPTION

Figure 1:
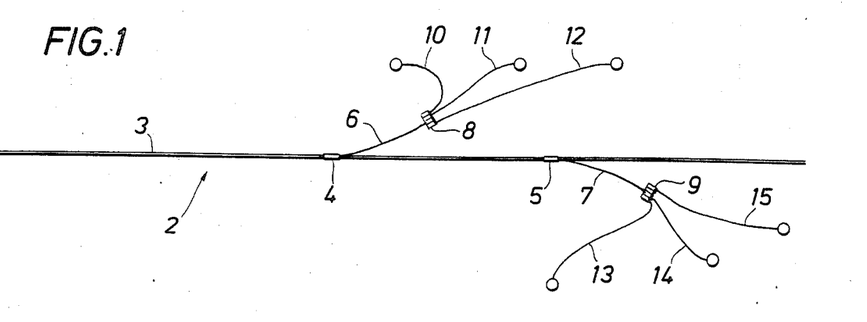
FIG. 1 is a diagrammatic representation of the basic components in a seismic exploration system embodying the concept of the present invention.

Referring now to FIG. 1, there may be seen a simplified diagrammatical representation of a typical seismic exploration network 2 which is basically composed of a main cable or trunk line 3 with a plurality of secondary lines 6 and 7 interconnected therewith at preselected points of connection 4 and 5. More particularly, it may also be seen that secondary line 6 is preferably interconnected at its remote end with a plurality of geophone strings 10-12, and that these strings are also joined together to form a junction assembly 8, in a particular embodiment of the present invention. Similarly, secondary line 7 which is interconnected with the trunk line 3 at the point of connection 5, may be seen to be interconnected at its remote end with another plurality of geophone strings 13-15, and that such strings are preferably interconnected with the secondary line 7 to form a junction assembly 9.

As hereinbefore stated, it is an object of the present invention to provide an improved connection means which will achieve a fluid-tight joinder of two or more electrical leads or terminals, in an expeditious manner, under such disadvantageous environmental conditions such as those encountered when working in a swamp and the like. In particular, it is an object of this invention to provide such a connector which, even though immersed in water, may thereafter be recovered and used without the necessity of predrying its contacts, and without incurring a risk of water communication between the contacts within the connector itself.

Figure 3:
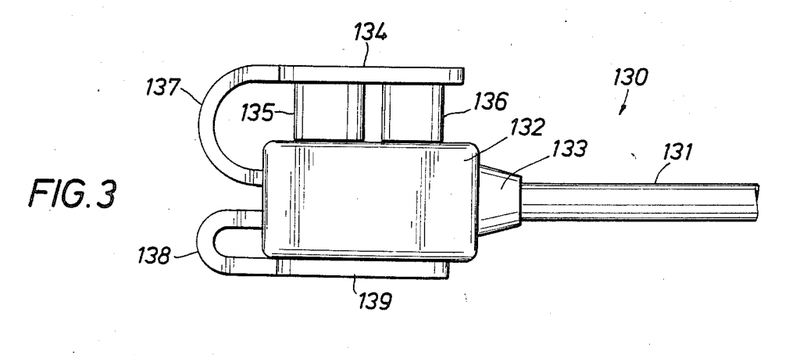
FIG. 3 is a a detailed pictorial representation of a selected portion of the structures depicted in FIG. 2.

Reference will now be made to FIGS. 3 and 4A-C for the details of a preferred embodiment of such a connector. Referring now to FIG. 3 in particular, there may be seen a simplified pictorial representation of a connector 130 which is composed of a rectangular block member 132 formed of a water-impervious insulated material and interconnected at one end to a cable 131. As will hereinafter be explained in detail, the connector 130 contains a pair of spaced-apart metallic terminals (not depicted) which are suitably interconnected with a corresponding plurality of electrical leads (not depicted) within the cable 131, and further arranged in the block member 132 so as to be exposed at both ends for electrical connection with another different component part of the network. Accordingly, protection for these exposed terminals is preferably provided by giving the block member 132 a strap-like member 137 having a pad portion 134 at its tip end, and with a pair of cap-like projections 135-136 for fluid-tight interconnection with the block member 132 for the purpose of protecting one end of each of these terminals. Similarly, another strap-like portion 138 extends flexibly from the block member 132 with a comparable pad end 139, and with a pair of plug-like stoppering members (not depicted in FIG. 3) mounted thereon for fluid-tightly engaging the block member 132 to seal off the opposite ends of the two terminal members.

As hereinbefore stated, it is a particular feature of this invention to prevent any invasion of water which would contact and provide a communication between any portion of these two terminals within the block member 132. Accordingly, and as depicted in FIG. 3, it may be seen that the block member 132 is preferably provided with a shoulder portion 133 which extends from one end of the block member 132, and which grippingly engages the adjacent end of the cable member 131 in such a manner as to prevent any fluid traveling from the exterior of the connector 130 and into the interior of the block member 132.

Figure 4A:
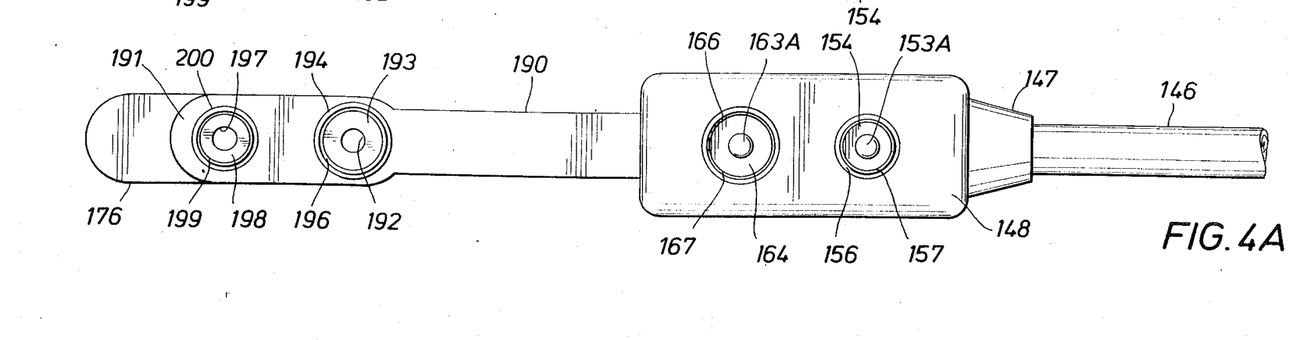
FIG. 4A is a pictorial representation of a bottom view of a part of the structure depicted in FIG. 2.
Figures 4B, 4C:
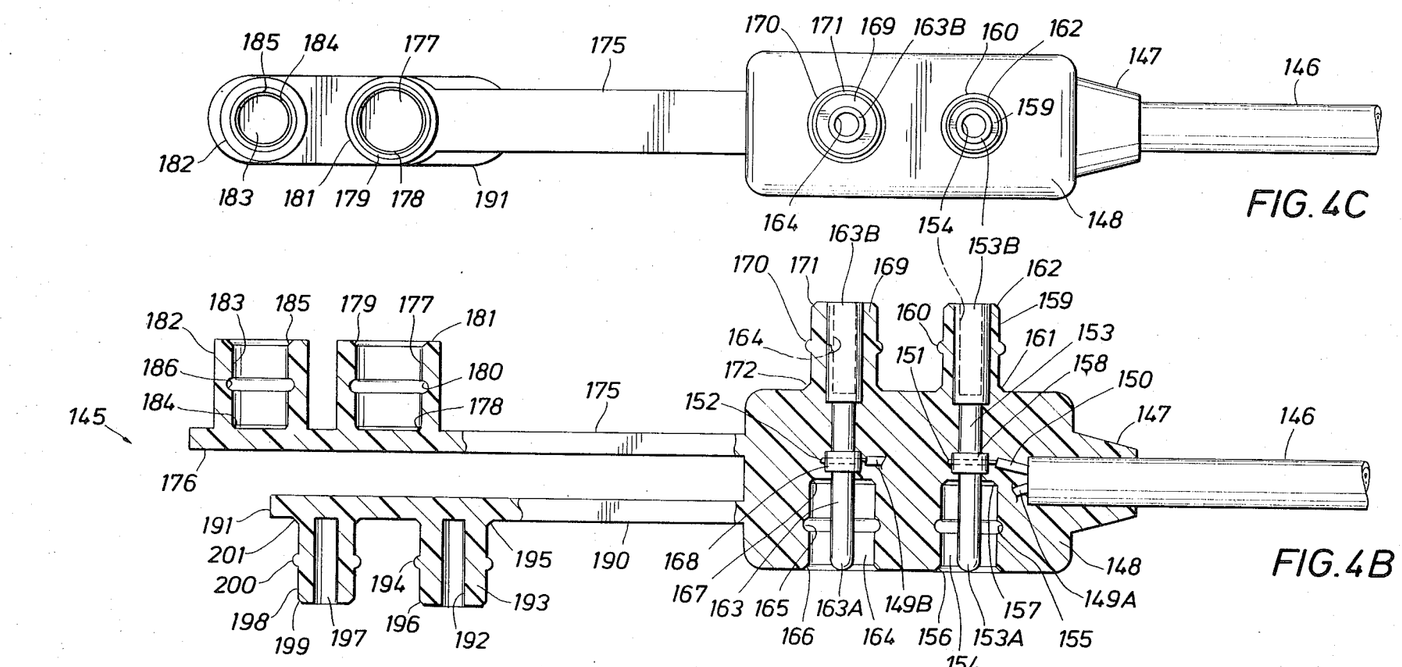
FIG. 4B is another pictorial representation of a side view, partly in cross-section, of the component depicted in FIG. 4A.
FIG. 4C is a further pictorial representation of a top view of the component depicted in FIGS. 4A and 4B.

Referring now to FIGS. 4A-C, there may be seen a more detailed representation of the various component parts of the connector 130 previously depicted pictorially in FIG. 3. More particularly, reference is now directed to FIG. 4B which provides a more detailed illustration of a similar connector 145, and which is preferably composed of a molded plastic block 148 containing a pair of terminals 153 and 163 imbedded therein and each having pin-like end portions 153A and 163A extending into sidewall recesses 154 and 164, and further having socket-like end portions 153B and 163B extending oppositely therefrom and into and through plug-like projections 159 and 169 extending from the opposite side of the block member 148. It may also be seen that the plug-like portion 159 has a smaller diameter than that of the plug-like projection 169, and that the diameters of plug-like extensions 159 and 169 correspond to the inside diameters of recesses 154 and 164, respectively. In addition, the two plug-like extensions 159 and 169 are each provided with annular collars 160 and 170, and that sidewall recesses 154 and 164 are provided with annular grooves 155 and 165 of a shape and location corresponding to the collars 160 and 170. In addition, the plug-like projection 159 is provided with a beveled edge 162 opposite its tip, and a beveled shoulder 161 at its base. Similarly, the plug-like extension 169 is provided with a beveled outer edge 171 and beveled or chamfered shoulder portion 172 adjacent its base. Likewise, the sidewall recess 154 is provide with a chamfered surface 157 at its base to correspond in dimension and location to the beveled edge 162 on the plug-like extension 159, and that it is further provided with a beveled surface 156 at its upper edge which corresponds in diameter and location to the shape and dimension of the chamfered surface 161 at the base of the plug-like extension 159. Similarly, plug-like extension 169 has a beveled outer edge 171 and a chamfered shoulder 172 which, respectively, correspond in location and size to the beveled surface 167 at the bottom of recess 164, and to the shape and size of the beveled inner rim 166 of the sidewall recess 164.

Referring again to the structures depicted in FIG. 4B, the cable means 146 may be seen to include a pair of leads 151 and 152 which, respectively, extend through apertures 158 and 168 in terminals 153 and 163, and which are individually coated with insulation 150 and 149A-B, respectively. In addition, it may be seen that leads 151 and 152, including insulation 150 and 149A-B, are all preferably covered with a water-impervious sheathing material which extends into one end of the block member 148. More particularly, block member 148 may be seen to be further provided with a shoulder portion 147 which exerts a gripping engagement with the adjacent end of the cable 146 so as to prevent any entry of water along the surface of the cable 146 and into the interior of the block member 148.

Referring again to the structures depicted in Figure 4B, it may be seen that the block member 148, which is preferably formed of a molded material, is further provided with a first strap-like extension 175 having a pad portion 176 at its outer end, and wherein the pad portion 176 supports a pair of cap-like projections 181 and 182 adapted to be releasably inserted onto and over the plug-like projections 159 and 169 extending from the sidewall of the block member 148. In particular, it may be seen that the cap-like projection 181 is provided with an inside diameter 177, and with surfaces 179 and 178 as well as annular groove 180, whereby cap-like projection 181 will fit appropriately about the plug-like projection 169, and that cap-like projection 182 is similarly designed to fit over plug-like projection 159. Thus, it may be seen that cap-like projection 182 is provided with an inside diameter 183, and with surfaces 185 and 184 as well as annular groove 186, whereby cap-like projection 182 will fit appropriately about the plug-like projection 159.

Referring again to the connector 145 depicted in FIG. 4B, the rectangular block 148 may be further be seen to be provided with a second strap-like extension 190 having a pad portion 191 at its outer end, and with plug-like projections 193 and 198 extending therefrom and corresponding in shape to sidewall recesses 154 and 164 in the opposite side of the block member 148. More particularly, plug-like extension 193 is not only provided with beveled and chamfered surfaces 195 and 196, and also an annular collar 194, to fit the interior surfaces 166 and 167 of the sidewall recess 164, but also into the annular groove 165 therein. In addition, plug-like extension 193 is also provided with an interior aperture 192 of a dimension and length such that plug-like projection 193 will enclose and protect the pin-like end portion of terminal 163 when the plug-like extension 163 is inserted fully within the sidewall recess 164. Similarly, plug-like extension 198 is not only provided with surfaces 199 and 201 to match surfaces 156 and 157 within the sidewall recess 154, but also an annular collar 200, to match the annular groove 155 within the sidewall recess 154. In addition, plug-like projection 198 is also provided with a central aperture 197 to fit about and over the pin-like end portion 153A of terminal 153 within the sidewall extension 154, whereby these terminals may be stoppered and sealed in the same manner as depicted in FIG. 3 of the drawings.

Referring again to FIG. 4B, it may be seen that block member 148 is preferably formed as a moulded article which provides for imbeddedly supporting the terminals 153 and 163 in a plastic material. Accordingly, it may be seen that the lead 149 will be coated with insulation material 149A and 149B, except where it connects with terminal 163, and whereby terminal 163 is further protected against invasion by water from the environment.

Referring again to the structures depicted in FIG. 4B, it should be noted that the features of this connector 145 are directed not only to providing for protection of the electrical terminals therein from water from the outside of the block member 148, but also for the purpose of permitting the connector 145 to be used under particularly disadvantageous conditions such as darkness, the presence of water in the environment, and other unfortunate aspects. In particular, plug-like projections 159 and 169 are of a different diameter so that the connector 145 may not be improperly joined with another part of the circuitry in a manner to reverse polarity in the system, which is also the same reason why sidewall recesses 154 and 164 are provided with different inside diameters. Similarly, the first strap member 175 may be seen to be longer than the second strap member 190, so that this unit may be handled and properly used under disadvantageous conditions such as limited light and the need to work in awkward surroundings.

Referring now to the structures depicted in FIG. 4A, there may be seen a simplified pictorial bottom view of the connector 145 whereby the central location of the terminals 153 and 163 may be seen to be coaxially arranged within the sidewall recesses 154 and 164, and whereby the second strap member 190 is shorter in length than the first strap member 175. Referring now to FIG. 4C, there may be seen a top view of the connector 145, whereby the socket-like end portions 153B and 163B of terminals 153 and 163 may be seen to be coaxially arranged within plug-like projections 159 and 169, and that strap member 175 is clearly longer than strap-member 190.

Figure 2:
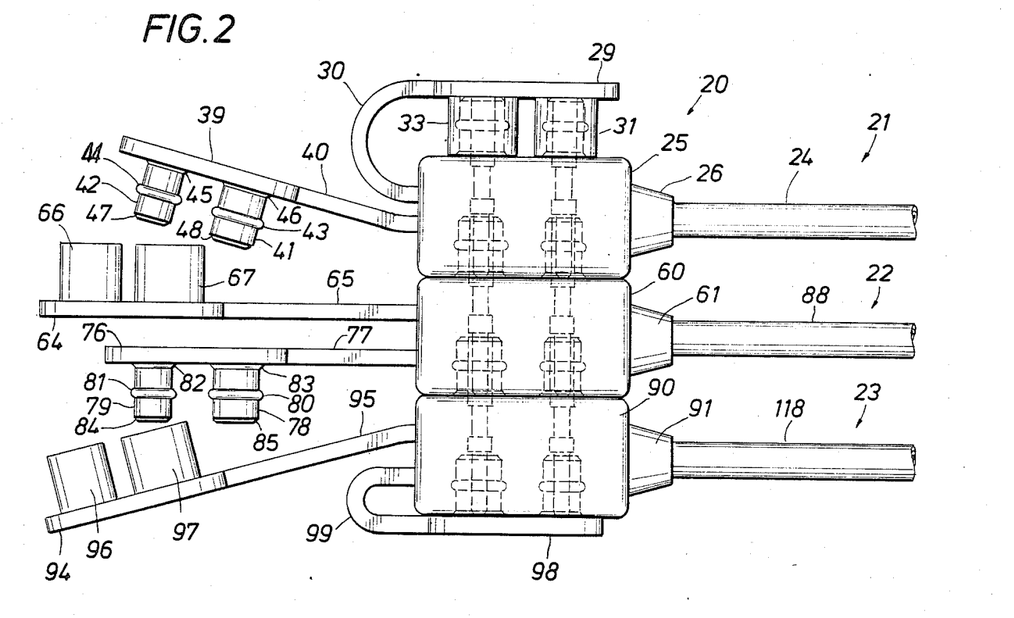
FIG. 2 is a detailed pictorial representation of a selected portion of the seismic system depicted in FIG. 1.

Referring now to FIG. 2, there may be seen a pictorial illustration of how three or more connectors 21–23 may be "stacked" together in a manner to prevent any water from invading and shorting out any of the electrical portions of the junction assembly 20 created by such a combination. More particularly, there may be seen how connector 22, which is composed of a similar block member 60 having a shoulder portion 61 for gripping the adjacent end of an electrical cable 88, and which is provided with strap members 65 and 77 for the purposes heretofore described, may be joined with connectors 21 and 23 by inserting the plug-like projections from block member 60 into the sidewall recesses of block member 25 of connector 21, and by inserting the plug-like projections from block member 90 of connector 23 into the sidewall recesses of block member 60 of connector 22. In this manner, the junction assembly 20 formed thereby will electrically interconnect the terminals in block 90 and electrical leads (not depicted) in cable member 118, of connector 23 with the terminals in block 60 and electrical leads (not depicted) in cable 88, and further with the terminals in block 25 of connector 21 and the electrical leads (not depicted) in cable 24 of connector 21. Inasmuch as the plug-like projections from block 60 are inserted into the sidewall apertures or recesses of block 25, and the sidewall recesses of block 60 are occupied by the plug-like projections from block 90, there is no need to employ the cap-like projections 66–67 from the pad 64 of the strap-like extension 65 of block 60. Nor is there any need to employ the plug-like projections 78 and 79 from the pad 76 of the other strap-like extension 77 from block 60. As to the cap-like projections 96 and 97 from pad 94 of the first strap-like extension 95 of block 90, these are also not needed inasmuch as the plug-like projections from block 90 are inserted into the sidewall recesses of block 60. Likewise, the plug-like projections 41–42 from the pad 39 of the second strap-like extension 40 of block 25 are also not needed, in this arrangement, inasmuch as the sidewall recesses in block 25 are occupied by the plug-like projections from block 60. On the other hand, it will be seen that the opposite ends of the terminals in block 25 are not connected with any other component, and are therefore exposed to the environment, whereby they are protected by inserting the cap-like projections 31 and 33 from pad 29 of the first strap-like extension 30 of the block 25. Similarly, the pin-like end portions of the terminals in block 90 are also not interconnected with any other part of the circuitry, and must therefore be shielded from the environment by means of the plug-like projections from pad 98 of the second strap-like extension 99 of block 90.

Referring again to the connectors 21–23 depicted in FIG. 2, it would be noted that these components are designed whereby they may be quickly and easily snapped together or disconnected by hand, without the necessity for concern as to their stacking order in the junction assembly 20. Thus, the plug-like projections 41–42 which extend from the pad 39 of the second strap-like portion 40 of block member 25 are the same as the plug-like projections 78–79 which extend from the pad 76 of the second strap-like portion 99 of block 90. Furthermore, it should be noted that the chamfered shoulders 45–46 of the plug-like projections 41–42 correspond to the chamfered shoulders 82–83 of projections 78–79, and that the beveled edges or rims 47–48 thereof correspond to the beveled edges 84–85 of projections 78–79, and further that the collar portions 41 and 43 correspond respectively to collar portions 80–81. Similarly, block members 25 and 90 are provided with shoulder portions 26 and 91 in the same manner as block member 60 is provided with shoulder portion 61.

Figure 2A:
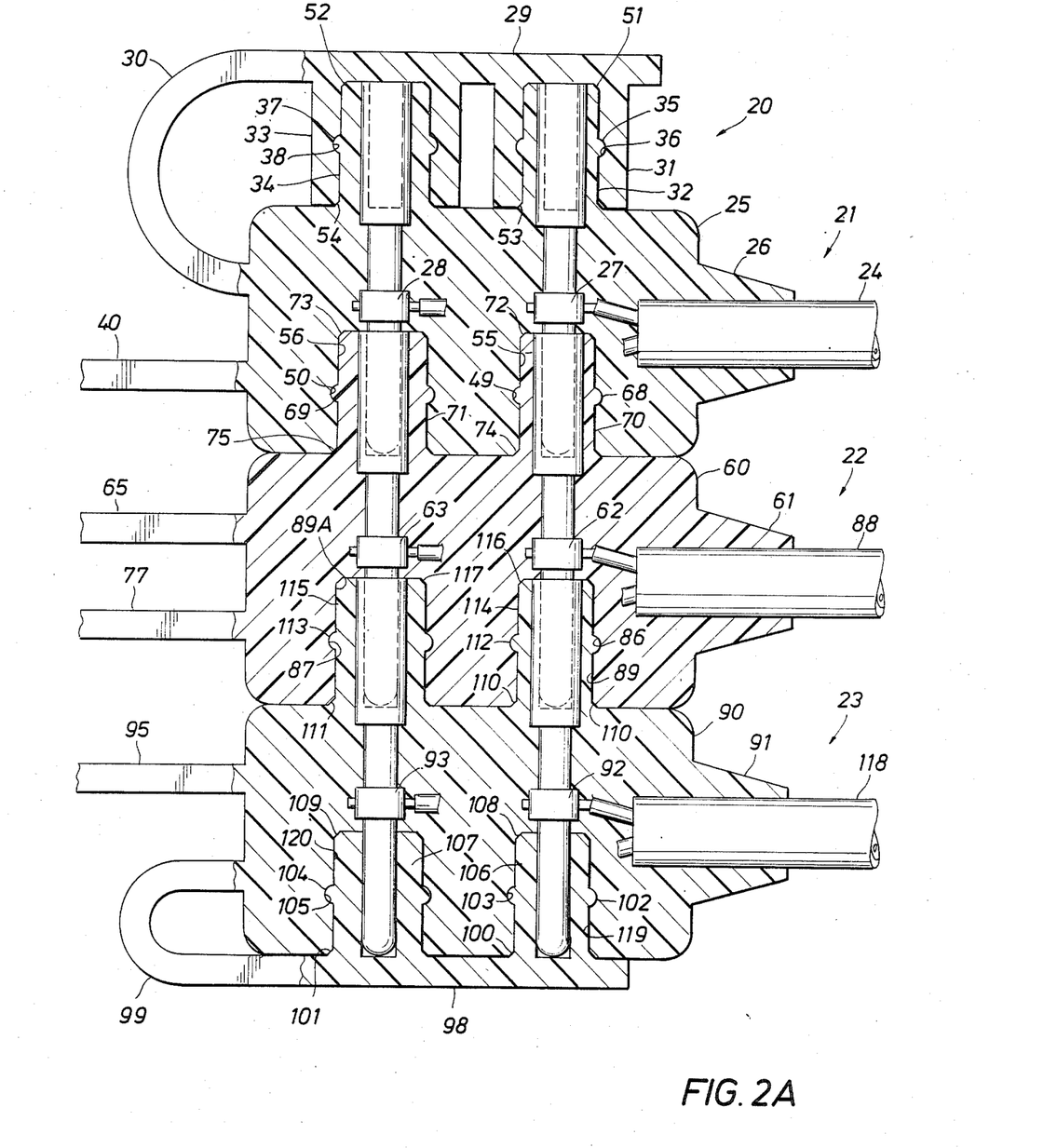
FIG. 2A is a more detailed pictorial representation, partly in cross-section, of a portion of the structures depicted in FIG. 2.

Referring now to FIGS. 2 and 2A in combination, there may be seen a more detailed illustration of the various component parts of connectors 21–23 when interconnected to form the junction assembly 20 as hereinbefore described, and more particularly to interconnect in such a manner as to seal off the electrical components from any deleterious aspects of the environment. In particular, it may be seen that block member 60 is provided with a shoulder portion 61 to sealingly grip the adjacent end of the cable member 88, and which are interconnected with terminals 62–63 in the block member 60, are sealed from any environmental fluids which might otherwise create a shorting electrical path between the terminals 62 and 63. Similarly, block member 90 of connector 23 is provided with a gripping shoulder portion 91 to prevent fluid from entering along the surface of cable member 118 and reaching terminals 92–93, and block member 25 is provided with a similar shoulder portion 26 to prevent liquid from entering and reaching terminals 27–28 from along cable 24.

Referring again to the junction assembly 20 depicted in FIG. 2A, it may be seen that when block member 90 is abutably positioned relative to the adjacent surface of block member 60, and when the plug-like projections 114–115 from block member 90 are inserted into the sidewall recesses 89 and 89A, the socket-like end portions of terminals 92 and 93 will be inserted over and into electrical contact with the pin-like end portions of terminals 62 and 63 in a manner to completely displace any environmental fluid from electrical communication not only from between terminals 92 and 92 but also terminals 62 and 63. Similarly, when plug-like projections 70–71 of block member 60 are inserted fully within sidewall recesses 55 and 56 of block member 25, and when the socket-like end portions of terminals 62 and 63 are inserted over the pin-like end portions of terminals 27 and 28, all environmental fluid will be displaced not only from establishing an electrical connection between terminals 62 and 63 but also with respect to terminals 27 and 28. Furthermore, displacement of such fluid, and prevention of invasion by said fluid into connectors 21 and 22 is further aided and assisted by the abutting relationship between block members 60 and 25, as well as the abutting relationship between block members 60 and 90.

In the case of a junction assembly 20 as depicted in FIG. 2A, it will be noted that the socket-like end portions of terminals 27 and 28 will be unconnected with any other part of the network, in the same manner that the pin-like end portions of terminals 92 and 93 will also be unconnected with respect to other parts of the network. Accordingly, terminals 92 and 93 are protected by insertion of the plug-like projections 106 and 107, which extend from pad 98 of the second strap-like extension 99 from block 90, into the sidewall apertures 119 and 120 in the block member 90. Similarly, the exposed socket-like end portions of terminals 27 and 28 are sealed from fluid in the environment by disposing the cap-like projections 31 and 33, which extend from the pad portion 29 of the first strap-like extension 30 from block 25, over the plug-like projections 32 and 34 from the block member 25.

Referring again to the structures depicted in FIG. 2A, it may be seen that block member 25 is also provided with a second strap-like portion 40 the same as with block member 90, and that block member 90 is provided with a first strap-like portion 95 the same as block member 25. Similarly, block member 60 is provided with both a first and a second strap-like portions 65 and 77, as hereinbefore described. In addition, it should be noted that the socket-like end portions of terminals 27–28 are protected against the environment because the beveled surfaces 51–52 and collar portions 35 and 37 correspond to and match the grooves 36 and 38 and chamfered surfaces 53–54. Similarly, collar portions 68–69, 11214 113, and 102 and 104 correspond to grooves 49–50, 86–87, and 103 and 105, respectively, just as chamfered surfaces 72–75, 116–117, 110–111, 108–109, and 100–101 all correspond.

This correspondence in surface dimensioning and shape, together with the fact that the components are formed of a relatively yieldable material, greatly contributes to the feature of this invention whereby the electrical contacts are sealed from communication with water or other materials in the ambient environment. When a plug-like projection is inserted into a sidewall recess, or when a cap-like projection is snapped over one of the plug-like projections illustrated herein, water then adhering to any metallic surface will be substantially displaced therefrom. Even if the connector has been inadvertently dropped into the water, the connector can be immediately retrieved and joined with another component embodying the concept of this invention, without the need to first dry the metallic surfaces therein, because there will be insufficient water in the connector to provide communication with another portion of the circuitry therein.

It will be apparent from a consideration of all of the features of the structures hereinafter described, that the advantages of the present invention are not limited in utility to only a seismic exploration network, but that a connector component of this concept will have other uses wherein a network must be constructed and operated within a disadvantageous environment. In particular, such a connector is particularly suitable for use in interconnecting panels and other components of solar energy systems of the type which are conventionally mounted permanently in the outdoors, and which must be serviced and repaired during disadvantageous conditions such as rainfall and the like. In addition, a junction assembly of the type depicted in FIGS. 2 and 2A are not limited to the particular number of connectors illustrated therein but may be composed of any number of such connectors as may be suitably "stacked" in the manner depicted.

As hereinbefore stated, another advantage of this type of connector is that it may be expeditiously connected and disconnected without the need for special tools or techniques, and in particular without the need of any particular skill. Furthermore, since such a connector is especially useful when being connected or disconnected in conditions of limited visibility, the operator will know when he has properly connected the component by virtue of the detent effect produced by the engagement or disengagement of the collar portions of the plug-like extensions into or out of the annular grooves within the sidewall apertures of these components. Likewise, the components cannot be improperly connected with respect to polarity in the circuitry, because of the dissimilarity in the diameters of the various plug-like projections and sidewall recesses.

Other variations and modifications will, of course, become apparent from a consideration of the structures and techniques hereinbefore described and depicted. Accordingly, it should be clearly understood that the present invention is not intended to be limited by the particular structures and methods hereinbefore described and depicted in the accompanying drawings, but that the concept of the present invention is to be measured by the scope of the appended claims herein.

What is claimed is:

1. An improved junction assembly for detachably interconnecting a plurality of electrical components to a seismic exploration network or other electrical system located in a deleterious environment, comprising a first substantially rectangular body member formed of a water-impervious insulating material with a plurality of sidewall recesses, a correspondingly plurality of plug-like extensions projecting oppositely of said recesses, a first strap-like portion carrying a corresponding plurality of cap-like projections, and a second strap-like portion carrying a corresponding plurality of plug-like extensions, a first plurality of electrical terminal members fixedly disposed in said first body member for interconnection with one of said components and each with a pin-like end portion projecting into one of said recesses and a socket-like opposite end portion extending into one of said plug-like extensions, a second substantially rectangular body member formed of a water-impervious insulating material with a plurality of sidewall recesses, a corresponding plurality of plug-like extensions projecting oppositely of said recesses, a third strap-like portion carrying a corresponding plurality of cap-like projections, and a fourth strap-like portion carrying a corresponding plurality of plug-like extensions, and a second plurality of electrical terminal members fixedly disposed in said second body member for interconnection with another different one of said components and each with a pin-like end portion projecting into one of said recesses and a socket-like opposite end portion extending into one of said plug-like extensions, said second body member being positioned abuttably against said first body member with said plug-like extensions projecting from said second body member inserted into corresponding sidewall recesses in said first body member and with the pin-like end portions of the terminals in the sidewall recesses in said first body member being inserted into the socket-like end portions of the terminals in corresponding ones of said plug-like extensions projecting from said second body member.

2. The junction assembly described in claim 1, wherein the diameter of one of said plurality of sidewall recesses in each of said body members is larger than the diameter of another of said plurality of sidewall recesses in each of said body members.

3. The junction assembly described in claim 2, wherein the diameter of one of said plurality of oppositely projecting plug-like extensions is larger than the diameter of another of said plurality of oppositely projecting plug-like extensions from each of said body members.

4. The junction assembly described in claim 3, wherein the cap-like projections from one of the strap-like portions of each of said body members have diameters corresponding to associated ones of the plug-like projections extending from such body member.

5. The junction assembly described in claim 4, wherein the plug-like projections from one of the strap-like portions of each of said body members have diameters corresponding to associated ones of the sidewall recesses in such body member.

6. The junction assembly described in claim 5, wherein said plug-like extensions from said fourth strap-like portion of said second body member are removably inserted into corresponding ones of said sidewall recesses in said second body member and said cap-like projections from said first strap-like portion of said first body member are removably inserted over corresponding ones of said plug-like extensions projecting from said first body member.

7. The junction assembly described in claim 6, wherein said plurality of plug-like extensions projecting from said second body member are further adapted for fluid-tight insertion into corresponding ones of said sidewall recesses in said first body member for sealing said pin-like end portions of said first terminal members against water from said environment.

8. The junction assembly described in claim 7, further comprising a first electrical cable means composed of a plurality of electrically insulated leads enclosed in a water-impervious sheathing material and having one end of each of said leads electrically connected to one of said first plurality of terminals and having the other ends of each of said leads adapted to be electrically connected to said one of said components, and a second electrical cable means composed of a plurality of electrically insulated leads enclosed in a water-impervious sheathing material and having one end of each of said leads electrically connected to one of said second plurality of terminals and having the other ends of each of said leads adapted to be electrically connected to said another different one of said components.

9. The junction assembly described in claim 8, wherein said first body member is grippingly secured to said first cable means adjacent said one ends of said leads in said first cable means and wherein said second body member is grippingly secured to said second cable means adjacent said one ends of said leads in said second cable means.

10. The junction assembly described in claim 9, wherein said first body member is further provided with a collar-like projecting portion extending from one end thereof grippingly about a portion of the sheathing material on said first cable means and wherein said second body member is further provided with a collar-like projecting portion extending from one end thereof grippingly about a portion of the sheathing material on said second cable means.

11. In a junction assembly for interconnecting an electrical component to a seismic exploration network or other electrical system, an improved connector in combination therewith comprising
   a substantially rectangular body member formed of a water-impervious insulating material and having a plurality of sidewall recesses, a corresponding plurality of open-ended and plug-like projections extending oppositely of said recesses, a first strap-like portion extending flexibly therefrom with a corresponding plurality of cap-like projections at the tip thereof, and a second strap-like portion extending flexibly therefrom with a corresponding plurality of open-ended and plug-like projections at the tip thereof, and
   a corresponding plurality of metallic terminal members imbedded fixedly in said body member for electrical interconnection with said component and each having a pin-like end portion extending into one of said sidewall recesses and a socket-like opposite end portion extending into and through one of said plug-like projections extending from said body member oppositely of one of said sidewall recesses therein.

12. The improved connector as described in claim 11, wherein the diameter of one of said sidewall recesses is larger than the diameter of another of said sidewall recesses in said body member.

13. The improved connector as described in claim 12, wherein the diameter of one of said plug-like projections is larger than the diameter of another of said plug-like projections in said body member.

14. The improved connector as described in claim 13, wherein said cap-like projections at the tip of said first strap-like projections at the tip of said first strap-like portion of said body member are each removably insertable fluid-tightly over one of said plug-like projections extending from said body member.

15. The improved connector as described in claim 14, wherein said plug-like projections at the tip of said second strap-like portion of said body member are each removably insertable fluid-tightly into one of said sidewall recesses in said body member.

16. The improved connector as described in claim 15, wherein said plug-like projections at the tip of said second strap-like portion of said body member are also each removably insertable fluid-tightly over the pin-like end portion of one of said terminal members.

17. The improved connector as described in claim 16, wherein each of said plug-like projections is further provided with an exterior annular shoulder portion and each of said cap-like projections and sidewall recesses is provided with an interior annular groove.

18. The improved connector as described in claim 17, wherein said annular shoulder projections on said plug-like projections are slidably and fluid-tightly insertable into the interior annular grooves in corresponding ones of said cap-like projections and said sidewall recesses.

19. The improved connector as described in claim 18, further comprising
   an electrical cable-like member composed of a plurality of insulated leads enclosed in a water-impervious sheathing material and each having one end adapted to be connected to said component and the other end fixedly disposed through one end of and into said body member and connected with one of said terminal members therein.

20. The improved connector as described in claim 19, wherein said body member is further provided with a collar-like shoulder portion extending from said one end thereof and grippingly affixed to and surrounding said other ends of said leads and the sheathing material thereon.

* * * * *

UNITED STATES PATENT AND TRADEMARK OFFICE
CERTIFICATE OF CORRECTION

PATENT NO. : 4,707,043

DATED : November 17, 1987

INVENTOR(S) : Charlie C. Reed

It is certified that error appears in the above-identified patent and that said Letters Patent is hereby corrected as shown below:

Column 2, line 68, "socketlike" should be --socket-like--;

Column 9, line 29, "41" should be --44--;

Column 9, line 57, "abutably" should be --abuttably--;

Column 10, line 42, "11214 113" should be --112-113--;

Column 11, line 46, "correspondingly" should be --corresponding--;

Column 14, line 7, delete "projections at the tip of said first strap-like".

Signed and Sealed this

Thirty-first Day of May, 1988

Attest:

DONALD J. QUIGG

Attesting Officer

Commissioner of Patents and Trademarks